US010738749B1

(12) United States Patent
Bergeron et al.

(10) Patent No.: US 10,738,749 B1
(45) Date of Patent: Aug. 11, 2020

(54) METHOD OF USING HEAT FROM FUEL OF COMMON-RAIL INJECTORS

(71) Applicant: PRATT & WHITNEY CANADA CORP., Longueuil (CA)

(72) Inventors: Sebastien Bergeron, Chambly (CA); Etienne Plamondon, Candiac (CA); Jean-Gabriel Gauvreau, Varennes (CA); Benjamin Renaud, Montmagny (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/294,160

(22) Filed: Mar. 6, 2019

Related U.S. Application Data

(63) Continuation-in-part of application No. 16/251,512, filed on Jan. 18, 2019.

(51) Int. Cl.
F02M 55/02 (2006.01)
F02M 63/02 (2006.01)
F02M 37/30 (2019.01)
F02B 53/10 (2006.01)
F02M 37/36 (2019.01)
F02D 41/38 (2006.01)
F02M 69/46 (2006.01)

(52) U.S. Cl.
CPC ........... F02M 55/025 (2013.01); F02B 53/10 (2013.01); F02D 41/3809 (2013.01); F02M 37/30 (2019.01); F02M 37/36 (2019.01); F02M 63/0275 (2013.01); F02M 69/465 (2013.01)

(58) Field of Classification Search
CPC ...... F02M 55/025; F02M 37/36; F02M 37/30; F02M 63/0275; F02M 69/465; F02D 41/3809; F02B 53/10
USPC ........................................................ 123/445
See application file for complete search history.

(56) References Cited

U.S. PATENT DOCUMENTS

| 4,176,641 | A |   | 12/1979 | Perr |
|---|---|---|---|---|
| 4,217,862 | A |   | 8/1980 | Fort et al. |
| 4,300,502 | A |   | 11/1981 | Driggers |
| 4,411,239 | A |   | 10/1983 | Kelch |
| 5,794,598 | A |   | 8/1998 | Janik |
| 6,142,127 | A | * | 11/2000 | Maass .................. F02M 55/025 |
|   |   |   |   | 123/514 |

(Continued)

FOREIGN PATENT DOCUMENTS

EP          2426344          2/2015

OTHER PUBLICATIONS

Advisory Action dated May 19, 2020, U.S. Appl. No. 16/251,512.
Non-Final Office Action dated Mar. 25, 2020, U.S. Appl. No. 16/352,030.

Primary Examiner — Mahmoud Gimie
(74) Attorney, Agent, or Firm — Norton Rose Fulbright Canada LLP

(57) ABSTRACT

There is disclosed a method of de-icing a component of an engine assembly having a common-rail fuel injection system, including: pressurizing fuel to circulate the fuel through the common-rail injection system; drawing a portion of the fuel upstream of common-rail injectors of the common-rail injection system and directing a remainder of the fuel toward the common-rail injectors; and transferring heat from the drawn portion of the fuel to the component.

19 Claims, 3 Drawing Sheets

(56) References Cited

U.S. PATENT DOCUMENTS

| | | | |
|---|---|---|---|
| 6,234,151 B1 * | 5/2001 | Eck | F02M 31/20 |
| | | | 123/514 |
| 6,257,208 B1 | 7/2001 | Harvey | |
| 6,397,826 B1 | 6/2002 | Coleman | |
| 6,520,162 B1 | 2/2003 | Schueler | |
| 7,637,252 B2 | 12/2009 | Jung et al. | |
| 7,640,919 B1 | 1/2010 | Smith | |
| 7,753,036 B2 | 7/2010 | Lents et al. | |
| 7,775,044 B2 | 8/2010 | Julien et al. | |
| 7,874,284 B2 | 1/2011 | Sano | |
| 8,166,943 B2 * | 5/2012 | Chamarthi | F02D 41/3845 |
| | | | 123/179.17 |
| 9,080,518 B2 | 7/2015 | Pursifull | |
| 2003/0111052 A1 | 6/2003 | Schueler | |
| 2003/0183198 A1 | 10/2003 | Mahr | |
| 2004/0003794 A1 | 1/2004 | Mahr | |
| 2006/0169252 A1 | 8/2006 | Ludwig et al. | |
| 2006/0185647 A1 | 8/2006 | Rapp | |
| 2007/0039865 A1 | 2/2007 | Jiang | |
| 2008/0156082 A1 | 7/2008 | Scheid | |
| 2008/0203347 A1 | 8/2008 | Burrola | |
| 2011/0146625 A1 | 6/2011 | Male | |
| 2011/0168133 A1 | 7/2011 | Pursifull | |
| 2012/0216778 A1 * | 8/2012 | Fulton | F02D 41/064 |
| | | | 123/445 |
| 2013/0024092 A1 | 1/2013 | Klesse | |
| 2013/0138327 A1 * | 5/2013 | Kojima | F02D 41/3005 |
| | | | 701/103 |
| 2015/0152800 A1 | 6/2015 | Male | |
| 2015/0204293 A1 * | 7/2015 | Ritsch | F02M 63/028 |
| | | | 123/468 |
| 2018/0128219 A1 | 5/2018 | Kapp et al. | |
| 2018/0187601 A1 | 7/2018 | Segura Martinez De Ilarduya et al. | |
| 2018/0347491 A1 | 12/2018 | Rousseau | |
| 2019/0107106 A1 | 4/2019 | Hagihara | |

* cited by examiner

METHOD OF USING HEAT FROM FUEL OF COMMON-RAIL INJECTORS

CROSS-REFERENCE TO RELATED APPLICATIONS

The present application claims priority on U.S. patent application Ser. No. 16/251,512 filed Jan. 18, 2019, the entire contents of which are incorporated herein by reference.

TECHNICAL FIELD

The application relates generally to combustion engines and, more particularly, to fuel systems of such engines.

BACKGROUND

Combustion engines include at least one combustion chamber into which fuel is provided, typically by a fuel injector. Some fuel injectors, such as common-rail injectors, generate a backflow of fuel that can reach high temperature during engine operation. More specifically, heat is generated as a result of the decompression of the fuel backflow from high pressure to low pressure. The fuel has to be highly pressurized first before being expanded. This thermal energy of the backflow is typically wasted, as the fuel backflow is usually returned directly back to the fuel tank. Better and more efficient fuel management in such fuel systems is therefore desirable.

SUMMARY

In one aspect, there is provided a method of de-icing a component of an engine assembly having a common-rail fuel injection system, comprising: pressurizing fuel to circulate the fuel through the common-rail injection system; drawing a portion of the fuel upstream of common-rail injectors of the common-rail injection system and directing a remainder of the fuel toward the common-rail injectors; and transferring heat from the drawn portion of the fuel to the component.

In another aspect, there is provided a method of de-icing a component of an engine assembly having a common-rail fuel injection system, comprising: pressurizing fuel to circulate the fuel through the common-rail injection system; injecting a portion of the fuel in common-rail injectors of the common-rail fuel injection system thereby generating a backflow of fuel; and transferring heat from a remainder of the fuel and/or from the backflow of fuel to the component.

In yet another aspect, there is provided an engine assembly comprising: a combustion engine having at least one combustion chamber and a fuel injection system including a common-rail injector fed by a fuel pump for injecting fuel into the at least one combustion chamber, the common-rail injector having an injector inlet fluidly connected to the pump via a fuel conduit; and a bypass conduit fluidly connected to the fuel conduit between the pump and the injector inlet, the bypass conduit being in heat exchange relationship with a component of the engine assembly in need of de-icing.

BRIEF DESCRIPTION OF THE DRAWINGS

Reference is now made to the accompanying figures in which.

DETAILED DESCRIPTION

Figure 1:
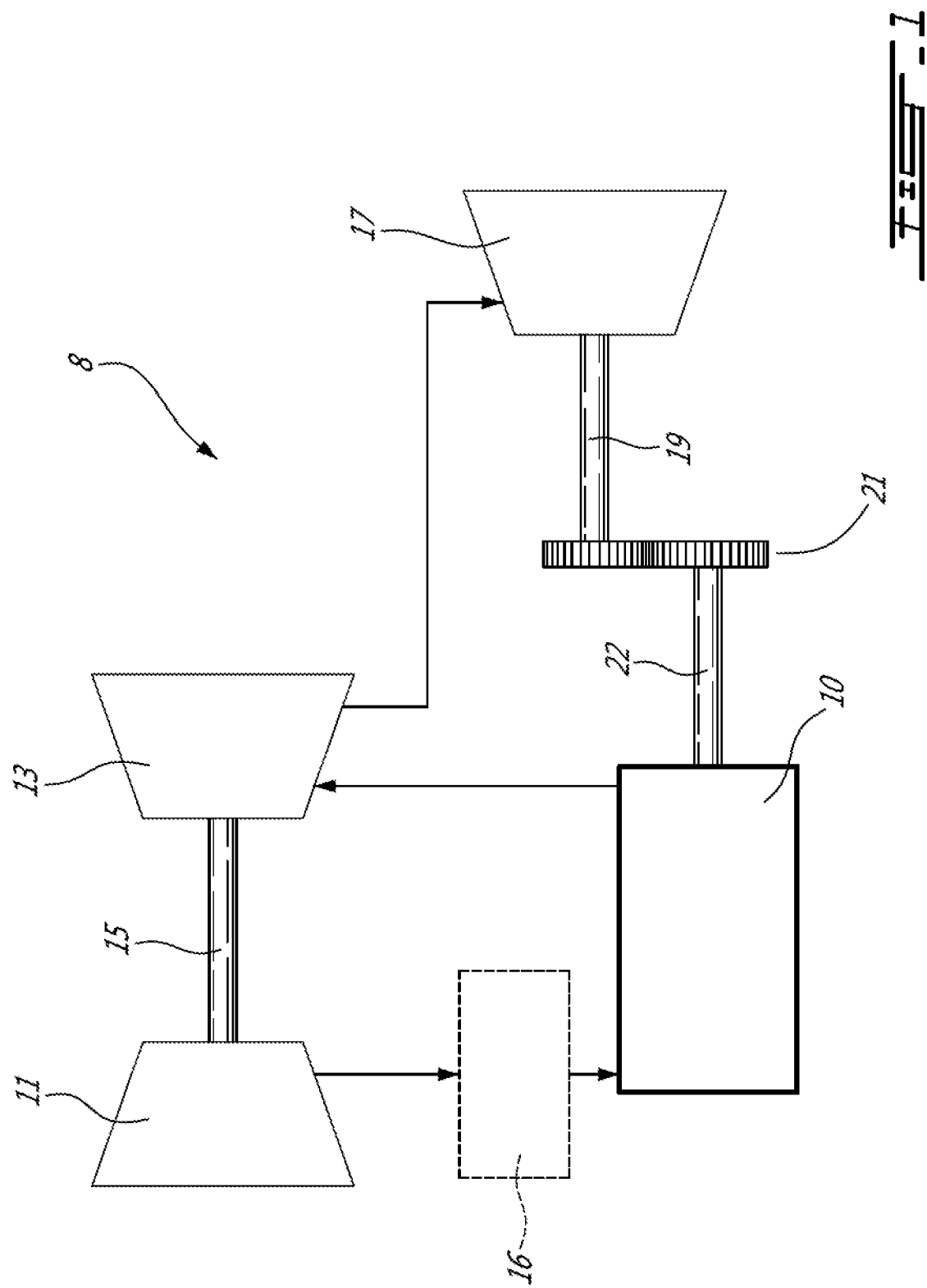
FIG. 1 is a block diagram of a compound engine system.

Referring to FIG. 1, a compound engine system 8 is schematically shown. The system 8 includes a compressor 11 and a turbine 13 which are connected by a shaft 15, and which act as a turbocharger to one or more rotary engines 10. The compressor 11 may be a single-stage or multiple-stage centrifugal device and/or an axial device. A rotary engine 10, or a plurality of rotary engines, receives compressed air from the compressor 11. The air optionally circulates through an intercooler 16 between the compressor 11 and the rotary engine(s) 10.

The exhaust gas exiting the rotary engine 10 is supplied to the compressor turbine 13 and also to a power turbine 17, the turbines 13, 17 being shown here in series, i.e. with the exhaust gas flowing first through one of the two turbines where the pressure is reduced, and then through the other turbine, where the pressure is further reduced. In an alternate embodiment (not shown), the turbines 13, 17 are arranged in parallel, i.e. with the exhaust gas being split and supplied to each turbine at same pressure. In another alternate embodiment, only one turbine is provided.

Energy is extracted from the exhaust gas by the compressor turbine 13 to drive the compressor 11 via the connecting shaft 15, and by the power turbine 17 to drive an output shaft 19. The output shaft 19 may be connected via a gear system 21 to a shaft 22 connected to the rotary engine(s) 10. The combined output on the shafts 19, 22 may be used to provide propulsive power to a vehicle application into which the system 8 is integrated. This power may be delivered through a gearbox (not shown) that conditions the output speed of the shafts 19, 22 to the desired speed on the application. In an alternate embodiment, the two shafts 19, 22 may be used independently to drive separate elements, e.g. a propeller, a helicopter rotor, a load compressor or an electric generator depending whether the system is a turboprop, a turboshaft or an Auxiliary Power Unit (APU).

Although not shown, the system 8 also includes a cooling system, including a circulation system for a coolant to cool the outer body of the rotary engine (e.g. water-ethylene, oil, air), an oil coolant for the internal mechanical parts of the rotary engine, one or more coolant heat exchangers, etc.

The compound engine system 8 may be as described in Lents et al.'s U.S. Pat. No. 7,753,036 issued Jul. 13, 2010 or as described in Julien et al.'s U.S. Pat. No. 7,775,044 issued Aug. 17, 2010, the entire contents of both of which are incorporated by reference herein.

Figure 2:
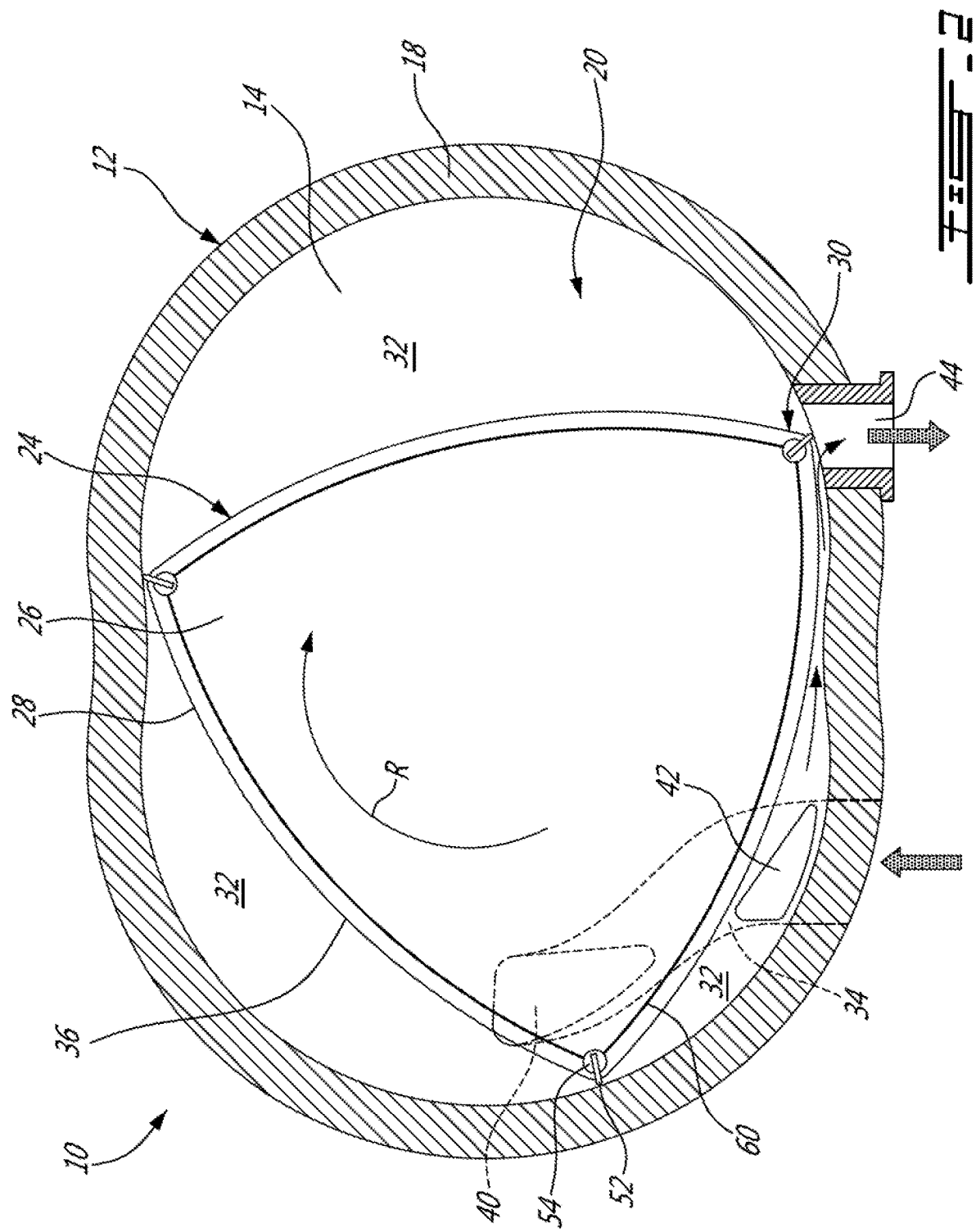
FIG. 2 is a schematic cross-sectional view of a rotary internal combustion engine in accordance with a particular embodiment.

The rotary engine 10 forms the core of the compound cycle engine system 8. Referring to FIG. 2, the rotary internal combustion engine 10, known as a Wankel engine, is schematically shown. The rotary combustion engine 10 comprises an outer body 12 having axially-spaced end walls 14 with a peripheral wall 18 extending therebetween to form a rotor cavity 20. The inner surface of the peripheral wall 18 of the cavity 20 has a profile defining two lobes, which is preferably an epitrochoid.

An inner body or rotor 24 is received within the cavity 20. The rotor 24 has axially spaced end faces 26 adjacent to the outer body end walls 14, and a peripheral face 28 extending therebetween. The peripheral face 28 defines three circumferentially-spaced apex portions 30, and a generally triangular profile with outwardly arched sides 36. The apex portions 30 are in sealing engagement with the inner surface of peripheral wall 18 to form three rotating combustion chambers 32 between the inner rotor 24 and outer body 12. The geometrical axis of the rotor 24 is offset from and parallel to the axis of the outer body 12.

The combustion chambers 32 are sealed. In the embodiment shown, each rotor apex portion 30 has an apex seal 52 extending from one end face 26 to the other and biased radially outwardly against the peripheral wall 18. An end seal 54 engages each end of each apex seal 52 and is biased against the respective end wall 14. Each end face 26 of the rotor 24 has at least one arc-shaped face seal 60 running from each apex portion 30 to each adjacent apex portion 30, adjacent to but inwardly of the rotor periphery throughout its length, in sealing engagement with the end seal 54 adjacent each end thereof and biased into sealing engagement with the adjacent end wall 14. Alternate sealing arrangements are also possible.

Although not shown in the Figures, the rotor 24 is journaled on an eccentric portion of a shaft such that the shaft rotates the rotor 24 to perform orbital revolutions within the stator cavity 20. The shaft rotates three times for each complete rotation of the rotor 24 as it moves around the stator cavity 20. Oil seals are provided around the eccentric to impede leakage flow of lubricating oil radially outwardly thereof between the respective rotor end face 26 and outer body end wall 14. During each rotation of the rotor 24, each chamber 32 varies in volumes and moves around the stator cavity 20 to undergo the four phases of intake, compression, expansion and exhaust, these phases being similar to the strokes in a reciprocating-type internal combustion engine having a four-stroke cycle.

The engine includes a primary inlet port 40 in communication with a source of air, an exhaust port 44, and an optional purge port 42 also in communication with the source of air (e.g. a compressor) and located between the inlet and exhaust ports 40, 44. The ports 40, 42, 44 may be defined in the end wall 14 of in the peripheral wall 18. In the embodiment shown, the inlet port 40 and purge port 42 are defined in the end wall 14 and communicate with a same intake duct 34 defined as a channel in the end wall 14, and the exhaust port 44 is defined through the peripheral wall 18. Alternate configurations are possible.

In a particular embodiment, fuel such as kerosene (jet fuel) or other suitable fuel is delivered into the chamber 32 through a fuel port (not shown) such that the chamber 32 is stratified with a rich fuel-air mixture near the ignition source and a leaner mixture elsewhere, and the fuel-air mixture may be ignited within the housing using any suitable ignition system known in the art (e.g. spark plug, glow plug). In a particular embodiment, the rotary engine 10 operates under the principle of the Miller or Atkinson cycle, with its compression ratio lower than its expansion ratio, through appropriate relative location of the primary inlet port 40 and exhaust port 44.

Figure 3:
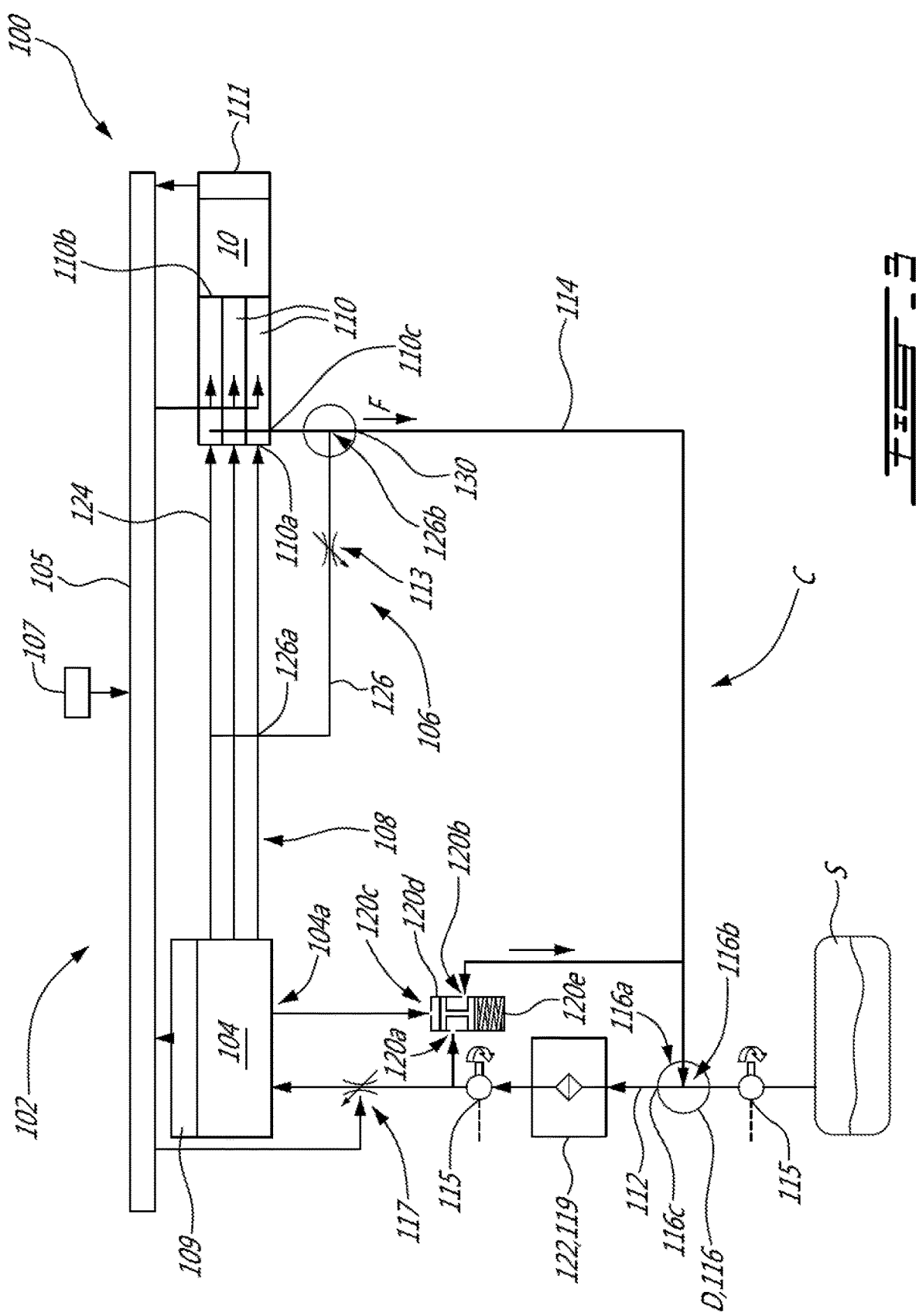
FIG. 3 is a schematic view of an engine assembly in accordance with one embodiment.

Referring to FIG. 3, an engine assembly is generally shown at 100. The engine assembly 100 may incorporate the compound cycle engine system 8 described herein above with reference to FIG. 1 and may include the rotary engine 10 described above with reference to FIG. 2, or any other suitable combustion engine. The engine 10 may however be any combustion engine, such as a gas turbine engine, a piston engine, a rotary engine, and so on. The disclosed engine assembly may also be implemented as a gas turbine engine used as an Auxiliary Power Unit (APU) in an aircraft. Accordingly, the term "combustion engine" as used herein is understood to include all of these types of engines (reciprocating combustion engines such as piston engines, rotating combustion engines such as rotary or Wankel engines, continuous flow engines such as gas turbine engines, etc.), and is therefore defined as any engine having one or more combustion chambers and having a fuel system feeding fuel to the combustion chamber(s). As will be described further below, the fuel system of the present engines uses common rail injection.

The engine assembly 100 includes a fuel injection system 102 for providing fuel to the combustion engine 10 from a fuel source S, which, in the embodiment shown, comprises a fuel tank. As shown, the fuel injection system 102 includes one or more high-pressure pump(s) 104 and a common-rail injector 106. The common-rail injector 106 includes a common rail 108 and individual injectors 110. The common-rail 108 is in fluid communication with each of the injectors 110.

In the embodiment shown, the engine assembly 100 includes a controller 105, which may be a Full Authority Digital Engine Control (FADEC). The controller 105 may be operatively connected to a power lever 107, which may be manually operable by a pilot of an aircraft equipped with the disclosed engine assembly 100. The controller 105 communicates with a high pressure fuel sensor 109, which is operatively connected to the high-pressure pump(s) 104 for determining fuel pressure, and with a speed sensor 111, which is operatively connected to the engine 10 for determining a speed of the engine 10. By receiving pressure and speed data from the pressure and fuel sensors 109, 111, the controller 105 controls an amount of fuel to be injected by the injectors 110 so that the engine 10 delivers the power required by the pilot via the power lever 107.

Still referring to FIG. 3, each of the fuel injectors 110 includes an inlet 110a, a first outlet 110b, and a second outlet 110c. The inlet 110a is fluidly connected to the source S of fuel, in the embodiment shown via the high-pressure pump(s) 104 and the common rail 108. The first outlet 110b is fluidly connected to the combustion chamber 32 (FIG. 2) of the internal combustion engine 10. The second outlet 110c is configured for expelling a backflow F of fuel from the injectors 110.

In a particular embodiment, the injector 110 includes housings and pistons movable within the housings from a first position in which the piston blocks the first outlet 110b of the injector 110 to a second position in which the piston is distanced from the first outlet 110b for allowing the fuel from the source of fuel S to be injected in the combustion chamber 32 (FIG. 2). Movement of the piston is induced by a pressure differential created by the high-pressure pumps 104. When the piston moves from the first position to the second position, a portion of the fuel that enters the injector 110 via its inlet 110a is not injected in the combustion chamber 32 and is expelled out of the injector 110 while bypassing the combustion chamber 32. The backflow F corresponds to this portion of the fuel that is expelled via the second outlet 110c of the fuel injector 110. When the fuel exits the fuel injector 110 via the second outlet 110c, its pressure decreases. During this decompression, the temperature of the fuel increases.

The temperature and pressure of the fuel increases as a result of its passage through the high-pressure pump(s) 104.

In use, the fuel that exits the injector 110 via the second outlet 110c can reach relatively high temperatures during the expansion process from the high pressure common-rail inlet to a low pressure circuit. As will be seen herein below, it is herein proposed to use this source of energy.

The fuel injection system 102 further has a fuel circuit C including a main conduit 112, for suppling the fuel from the source of fuel S to the injector 110, and a return conduit 114 for receiving the backflow F of fuel.

In the embodiment shown, a mixing device D, such as a connector 116, connects the return conduit 114 to the main conduit 112. More specifically, the connector 116 has a first inlet 116a, a second inlet 116b, and an outlet 116c; the first and second inlets 116a, 116 being fluidly connected to the outlet 116c. The outlet 116c of the connector 116 is fluidly connected to the main conduit 112, which is, in turn, connected to the inlet side of the pump 104 and, thus, to the common rail injector 106. The first inlet 116a of the connector 116 is fluidly connected to the second outlets 110c of the injectors 110. The second inlet 116b is fluidly connected to the fuel source S. As shown, the first inlet 116a is fluidly connected to the second outlet 110c of the injector 110 via the return conduit 114.

The fuel circuit C includes at least one fuel pump 115, two in the embodiment shown, which may be fluidly connected on the main conduit 112 and configured to draw fuel from the fuel source S and to direct the drawn fuel to the high-pressure pump(s) 104. A metering valve 117 may be fluidly connected to the main conduit 112 upstream of the high-pressure pumps 104 for controlling a flow rate of fuel entering the high-pressure pumps 104. As shown, the metering valve 117 is operatively connected to the controller 105 for feeding data thereto about a mass flow rate of fuel entering the high-pressure fuel pumps 104. A fuel filter 119 may be fluidly connected to the main conduit 112 upstream of the high-pressure pump 104. In the embodiment shown, the fuel filter 119 is located between the two pumps 115 and downstream of the connector 116 relative to a flow of fuel from the fuel source S to the high-pressure fuel pump(s) 104. The mixing device D may be located upstream of both of the pumps 115. The fuel circuit C further includes a pressure increasing device 113, which may be a variable control orifice, for increasing a pressure of the fuel in the bypass conduit 126. A size of the orifice of the variable control orifice may be controlled manually and/or electronically to control a mass flow rate in the bypass conduit 126.

In the embodiment shown, a pressure regulating valve 120 is fluidly connected to the fuel circuit C. The valve 120 has an inlet 120a and an outlet 120b fluidly connectable to the inlet 120a. The valve 120 further has a control inlet 120c whose function is described below.

The valve 120 has a member 120d movable between a close position (as shown) and an open position (not shown). In the close position, a flow of fuel from the main fuel conduit 112 to the return conduit 114 is permitted. The inlet 120a of the valve 120 is fluidly connected to the outlet 120b of the valve 120 in the open position of the member 120d. In the embodiment shown, the member 120d is biased in the close position using a biasing member 120e, which may be a spring.

In the embodiment shown, the high-pressure pump(s) 104 have a control outlet 104a fluidly connected to the control inlet 120c of the pressure regulating valve 120. The pressure of the fuel entering the high-pressure pumps 104 from the fuel source S is preferably within a given range. If the pressure of the fuel entering the high-pressure pump(s) 104 is above a given pressure threshold, a pressure at the control outlet 104a increases and pushes the valve 120 from the close position to the open position thereby allowing fuel to flow from the main fuel conduit 112 to the return conduit 114. In other words, the pressure regulating valve 120 provides an escape route for excess fuel that would otherwise increase inlet fuel pressure of the high-pressure pump(s) 104 above the given pressure threshold.

In the embodiment shown, the high-pressure pump(s) 104 is fluidly connected to the injectors 110 via fuel conduits 124. Each of the injectors 110 may have its inlet 110a fluidly connected to the high-pressure pump 104 via a respective one of the fuel conduits 124.

In some operating conditions, temperature might decrease below a temperature threshold below which certain components of the engine assembly 100 are at risk. A component 122 that is typically subject to icing is the fuel filter 119. However, it is understood that the component 122 may be any component in need of icing prevention or de-icing. Other components may be de-iced and/or protected against ice accumulation. For instance, the bypass conduit 126 and/or the return conduit 114 may be wrapped around components in need of de-icing and/or ice accumulation protection such that they may be able to transfer heat of the fuel circulating within the conduits 114, 126 to the component either by conduction, radiation, and/or convection.

The fuel circulating in the fuel conduits 124 between the high pressure pump 104 and the injectors 110 is at high pressure (e.g., 500 bars) and at high temperature as it has been compressed by the high pressure pump(s) 104. The fuel circulating in the return conduit 114 may be at a high temperature as it has been heated through its passage in the high pressure pump 104. The temperature of the fuel circulating in both of the fuel conduits 124 and in the return conduit 114 may be at temperature beyond a temperature of the fuel directly downstream of the fuel source S.

It might be advantageous to use the heat of the backflow of fuel F. In the embodiment shown, the return conduit 114 is in heat exchange relationship with the component 122. Herein, "heat exchange relationship" refers to any suitable mean by which heat may be transferred from fuel circulating within a conduit to the component. A heat exchanger may be use to transfer heat from the fuel of the return conduit 114 to the component 122. Alternatively, the return conduit 114 may transfer the heat of the fuel circulating therein to the component 122 by being in contact therewith. Any heat transferring mode, such as conduction, convection, and radiation, may be used alone or in any combination.

In the depicted embodiment, heat from the backflow of fuel F is transmitted to the component 122 via the main conduit 112. As previously described, the return conduit 114 is fluidly connected to the main conduit 112 via the mixing device D (e.g., connector 116); the mixing device D being located upstream of the component 112 relative to a flow of fuel in the main conduit from the fuel source S to the high-pressure pump 104. The mixing device D configured for mixing the backflow of fuel F with the fuel from the fuel source S.

Heat from the backflow of fuel F is transferred to the fuel coming from the fuel source S thereby increasing its temperature. The heat of the combined backflow of fuel F and fuel from the fuel source heated by the backflow of fuel F is transmitted to the component 122. In the embodiment shown, the component 122 is the fuel filter 119 and the heat of the combined flows is transmitted to the fuel filter 119 by circulating said combined flows through the fuel filter 119.

In other words, the fuel filter 119 might be de-iced, or an accumulation of ice might be limited, by the fuel that it simultaneously filters.

Alternatively, or in combination with the heat of the backflow of fuel F, it might be advantageous to use the heated and pressurized fuel before it is injected in the injectors 110.

In the depicted embodiment, a bypass conduit 126 is fluidly connected to the fuel conduits 124. The bypass conduit 126 may have a plurality of upstream connection points 126a each being fluidly connected to a respective one of the fuel conduits 124. The bypass conduit 126 has a downstream connection point 126b that may be connected to the return conduit 114. In the embodiment shown, the downstream connection point 126b of the bypass conduit 126 is fluidly connected to the return conduit 114 downstream of the second outlets 110c of the injectors 110 and upstream of the connector 116 relative to a direction of the backflow F circulating in the return conduit 114.

In the depicted embodiment, the bypass conduit 126 is in heat exchange relationship with the component 122 in need of de-icing and/or icing prevention. In the embodiment shown, the bypass conduit 126 is in heat relationship with the component 122 by circulating the fuel circulating within the bypass conduit 126 through the component 122. In the embodiment shown, the bypass conduit 126 is in heat exchange relationship with the component via the return conduit 114. In other words, the fuel circulating in the bypass conduit 126, from the fuel conduits 124, is injected in the return conduit 114 upstream of the component.

In one embodiment, a valve 130 may be fluidly connected at the connection point 126b of the bypass conduit 126 with the return conduit 114; the valve operable between a close configuration in which fluid flow communication between the bypass conduit 126 and the return conduit 114 is limited and an open configuration in which the bypass conduit 126 is fluidly connected to the return conduit 114. The valve 130 may be switched open from the close configuration to the open configuration if heat from the backflow of fuel F is not sufficient for de-icing/preventing ice accumulation in the component 122.

In a particular embodiment, the valve 130 may be operatively connected to the controller 105, which may change a configuration of the valve 130 in function of operating conditions (e.g., temperature), in which the component 122 is operated.

Energy of the backflow of fuel F coming out of the common-rail injectors 110 or directly from the common-rail fuel conduits 124 upstream of the injectors 110 may be used to heat up or maintain a fuel temperature above a certain low limit to limit icing condition in the fuel injection system 102. This concept might be applicable for a plurality of engine applications such as turboshaft, turboprop, turbofan and APU using common-rail technology.

The disclosed engine assembly 100 might be able to use the fuel temperature energy from the common-rail high pressure fuel system to prevent any icing condition in the fuel system without using fuel system icing inhibitor (FSII) or a fuel oil heat exchanger (FOHE).

In a particular embodiment, the disclosed engine assembly 100, by not having a fuel oil heat exchanger (FOHE) and/or by not having an fuel system icing inhibitor (FSII) might be lighter than an engine assembly including a FOHE and/or FSII. The disclosed engine assembly 100 might be less complex and/or less expensive than an engine assembly using other technologies for warming up fuel. The disclosed system may be used to warm up other components or systems exposed to, or sensitive to, cold temperatures.

For de-icing the component 122, fuel is pressurized to circulate through the common-rail injection system 102; a portion of the fuel is drawn upstream of common-rail injectors 110 of the common-rail injection system 102 and a remainder of the fuel is directed toward the common-rail injectors 110; and heat from the drawn portion of the fuel is transferred to the component.

In the embodiment shown, transferring heat from the drawn portion of the fuel to the component 122 includes injecting the drawn portion of the fuel in the main conduit 112 to which the component 122 is fluidly connected and upstream of the component 122. As illustrated, directing the remainder of the fuel toward the common-rail injectors 110 includes generating the backflow of fuel F from the common-rail injectors 110; transferring heat from the drawn portion of the fuel further comprises transferring heat from the backflow of fuel F to the component 122. Herein, transferring heat from the backflow of fuel F to the component 122 includes injecting the backflow of fuel F in the main conduit 112 to which the component 122 is fluidly connected and upstream of the component 122. As illustrated in FIG. 3, transferring heat from the backflow of fuel F to the component 122 includes mixing the backflow of fuel F with the drawn portion of the fuel upstream of the component 122. In the embodiment shown, drawing the portion of the fuel upstream of the common-rail injectors 110 of the common-rail injector 108 includes drawing a fraction of the portion of the fuel from each of fuel conduits 124 being fluidly connected to a respective one of the common-rail injectors 110. In the depicted embodiment, the drawn portion of the fuel is injected in the in the return conduit 114.

For de-icing the component 122, fuel is pressurized to circulate through the common-rail injection system 102; a portion of the fuel is injected in the common-rail injectors 110 of the common-rail fuel injection system thereby generating a backflow of fuel; and heat is transferred from a remainder of the fuel and/or from the backflow of fuel to the component 122.

In a particular embodiment, injecting the portion of the fuel in the common-rail injectors includes injecting all of the fuel in the common-rail injectors 110 and transferring heat from the remainder of the fuel and/or the backflow of fuel F includes transferring heat from the backflow of fuel F to the component 122. In one embodiment, it may be determined that heat from the backflow of fuel F is insufficient for de-icing the component 122 and a ratio of a volume of the remainder of the fuel over a volume of the portion of the fuel may be increased. The fuel may be divided in a first fraction and a second fraction upstream of the common-rail injectors 110; the first fraction corresponding to the portion of the fuel injected in the common-rail injectors 110, and heat from the second fraction of the fuel is transferred to the component. In a particular embodiment, transferring heat from the remainder of the fuel to the component 122 includes transferring heat from the backflow of fuel F and from the second fraction of the fuel to the component 122. Herein, transferring heat from the remainder of the fuel and/or the backflow of fuel F to the component 122 includes transferring heat from both of the remainder of the fuel and from the backflow of fuel F to the component 122. In the embodiment shown, the remainder of the fuel is injected in the return conduit 114 and bypasses the common-rail injectors 110.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A method of de-icing a component of an engine assembly having a common-rail fuel injection system, comprising:
   pressurizing fuel to circulate the fuel through the common-rail injection system;
   drawing a portion of the fuel upstream of common-rail injectors of the common-rail injection system and directing a remainder of the fuel toward the common-rail injectors; and
   transferring heat from the drawn portion of the fuel to the component.

2. The method of claim 1, wherein transferring heat from the drawn portion of the fuel to the component includes injecting the drawn portion of the fuel in a fuel conduit to which the component is fluidly connected and upstream of the component.

3. The method of claim 1, wherein directing the remainder of the fuel toward the common-rail injectors includes generating a backflow of fuel from the common-rail injectors, transferring heat from the drawn portion of the fuel further comprises transferring heat from the backflow of fuel to the component.

4. The method of claim 3, wherein transferring heat from the backflow of fuel to the component includes injecting the backflow of fuel in a fuel conduit to which the component is fluidly connected and upstream of the component.

5. The method of claim 3, wherein transferring heat from the backflow of fuel to the component includes mixing the backflow of fuel with the drawn portion of the fuel upstream of the component.

6. The method of claim 1, wherein drawing the portion of the heated fuel upstream of the injectors of the common-rail injector includes drawing a fraction of the portion of the heated fuel from each of fuel conduits being fluidly connected to a respective one of the injectors.

7. The method of claim 1, wherein the engine assembly includes a main fuel conduit fluidly connecting a fuel source to the common-rail injectors and a return conduit fluidly connecting the common-rail injectors to the main fuel conduit, the method further comprising injecting the drawn portion of the fuel in the return conduit.

8. A method of de-icing a component of an engine assembly having a common-rail fuel injection system, comprising:
   pressurizing fuel to circulate the fuel through the common-rail injection system;
   injecting a portion of the fuel in common-rail injectors of the common-rail fuel injection system thereby generating a backflow of fuel;
   transferring heat from the backflow of fuel to the component; and
   determining that heat from the backflow of fuel is insufficient for de-icing the component and increasing a ratio of a volume of a remainder of the pressurized fuel over a volume of the portion of the pressurized fuel.

9. The method of claim 8, wherein injecting the portion of the fuel in the common-rail injectors includes injecting the portion fuel in the common-rail injectors via fuel conduits, increasing a ratio of a volume of a remainder of the pressurized fuel over a volume of the portion of the pressurized fuel includes increase a flow rate of the fuel drawn from the fuel conduits upstream of the common-rail injectors.

10. The method of claim 8, further comprising dividing the fuel in a first fraction and a second fraction upstream of the common-rail injectors, the first fraction corresponding to the portion of the fuel injected in the common-rail injectors, and further comprising transferring heat from the second fraction of the fuel to the component.

11. The method of claim 10, wherein transferring heat from the remainder of the fuel to the component includes transferring heat from the backflow of fuel and from the second fraction of the fuel to the component.

12. The method of claim 8, wherein transferring heat from the backflow of fuel to the component and determining that heat from the backflow of fuel is insufficient includes transferring heat from both of the remainder of the fuel and from the backflow of fuel to the component.

13. The method of claim 12, further comprising mixing the remainder of the fuel with the backflow of fuel before transferring the heat to the component.

14. The method of claim 8, wherein the engine assembly includes a main fuel conduit fluidly connecting a fuel source to the common-rail injectors and a return conduit fluidly connecting the common-rail injectors to the main fuel conduit, the method further comprising injecting the remainder of the fuel in the return conduit and bypassing the common-rail injectors.

15. An engine assembly comprising: a combustion engine having at least one combustion chamber and a fuel injection system including a common-rail injector fed by a fuel pump for injecting fuel into the at least one combustion chamber, the common-rail injector having an injector inlet fluidly connected to the pump via a fuel conduit; and a bypass conduit fluidly connected to the fuel conduit between the pump and the injector inlet, the bypass conduit being in heat exchange relationship with a component of the engine assembly in need of de-icing.

16. The engine assembly of claim 15, wherein the injector has an injector outlet for outputting a backflow of fuel, a return conduit fluidly connected to the injector outlet for directing the backflow of fuel back toward the pump, the return conduit in heat exchange relationship with the component.

17. The engine assembly of claim 16, wherein the bypass conduit is fluidly connected to the return conduit at a connection point located upstream of the component relative to the backflow flowing in the return conduit.

18. The engine assembly of claim 16, further comprising a valve fluidly connected on the return conduit, the valve operable between a close configuration in which fluid flow communication between the bypass conduit and the return conduit is limited and an open configuration in which the bypass conduit is fluidly connected to the return conduit.

19. The engine assembly of claim 15, wherein the component is a fuel filter fluidly connected to the bypass conduit.

* * * * *